United States Patent
Ito et al.

(10) Patent No.: US 8,296,099 B2
(45) Date of Patent: Oct. 23, 2012

(54) VEHICLE TILT DETECTING APPARATUS AND SEAT LOAD DETECTING APPARATUS USING THE SAME

(75) Inventors: Koji Ito, Yatomi (JP); Muneto Inayoshi, Nagoya (JP); Akira Enomoto, Kariya (JP); Hiroyuki Fujii, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 363 days.

(21) Appl. No.: 12/813,869

(22) Filed: Jun. 11, 2010

(65) Prior Publication Data

US 2011/0010109 A1    Jan. 13, 2011

(30) Foreign Application Priority Data

Jul. 8, 2009    (JP) ................. 2009-161871

(51) Int. Cl.
- *G01G 7/00* (2006.01)
- *G01G 19/22* (2006.01)
- *G04F 5/00* (2006.01)

(52) U.S. Cl. ............ 702/173; 702/154; 177/25.11; 700/305; 701/45

(58) Field of Classification Search ............ 702/154; 177/25.11; 700/305; 701/45
See application file for complete search history.

(56) References Cited

U.S. PATENT DOCUMENTS

| | | | |
|---|---|---|---|
| 6,748,814 B2 | 6/2004 | Ishida et al. | |
| 6,786,104 B1 | 9/2004 | Aoki | |
| 6,840,119 B2 | 1/2005 | Aoki | |
| 2002/0059022 A1* | 5/2002 | Breed et al. | 701/45 |
| 2003/0056997 A1* | 3/2003 | Breed et al. | 177/144 |
| 2011/0082626 A1* | 4/2011 | Foo et al. | 701/46 |

FOREIGN PATENT DOCUMENTS

| JP | 2001-150997 A | 6/2001 |
|---|---|---|
| JP | 2002-318113 A | 10/2002 |
| JP | 3904913 B2 | 4/2007 |

\* cited by examiner

*Primary Examiner* — Andrew Schechter
*Assistant Examiner* — L. Anderson
(74) *Attorney, Agent, or Firm* — Buchanan Ingersoll & Rooney PC (57) ABSTRACT

A vehicle tilt detecting apparatus includes a load sensor provided for detecting a load acts on a supporting portion, a load detecting portion detecting a partial load value of the load placed on the seat on the basis of an output from the load sensor and outputting a detected load value, first interrelating portion indicates a relation between a detected load value of no-load and a front-rear tilt angle of the vehicle, unoccupied seat determining portion determining an unoccupied state, where no-load is placed on the seat, when the detected load value outputted from the load detecting portion is less than an unoccupied seat determining value and front-rear tilt angle calculating portion calculating the front-rear tilt angle corresponding to the detected load value outputted from the load detecting portion, on the basis of the first interrelating portion, when the unoccupied seat determining portion determines the unoccupied state.

20 Claims, 6 Drawing Sheets

VEHICLE TILT DETECTING APPARATUS AND SEAT LOAD DETECTING APPARATUS USING THE SAME

CROSS REFERENCE TO RELATED APPLICATIONS

This application is based on and claims priority under 35 U.S.C. §119 to Japanese Patent Application 2009-161871, filed on Jul. 8, 2009, the entire content of which is incorporated herein by reference.

TECHNICAL FIELD

This disclosure relates to a vehicle tilt detecting apparatus by which a front-rear tilt angle of a vehicle and/or a right-left tilt angle of the vehicle is detected, and such vehicle tilt detecting apparatus is adapted to be used by a seat load detecting apparatus.

BACKGROUND DISCUSSION

In recent times, an automobile, equipped with a power slide door or a hinged door that are operated to be opened/closed by use of electric power, hydraulic power or the like, has been in practical use. According to such automobile, a tilt angle of the automobile may be detected in order to adjust a level of the operational force, generated by the electric power, the hydraulic power or the like, used for the opening/closing operation of the door. The detection of the tilt angle is also useful for a power control at the time when the vehicle starts moving on a sloping road. One example of a sensor for detecting the tilt angle of the vehicle is disclosed in JP2002-318113A. A tilt sensor disclosed in JP2002-318113A includes a guide portion formed with a V-shaped groove in its cross section and a light shield body formed in a sphere shape and inserted into the guide portion. The tilt sensor in this configuration works to detect a degree of a sloping road (detect a tilt angle of a vehicle in a front-rear direction thereof) on the basis of a position of the light shield body detected by means of a photoelectric element.

Further, in order to improve a level of performance of a safety equipment such as a seatbelt, an air-bag or the like, an actuation of the safety equipment may be controlled in accordance with a weight of a passenger sitting on a vehicle seat to which the safety equipment is provided. For example, when a passenger sitting on the seat does not fasten the seat belt, the passenger is generally notified of not wearing the seat belt by an alarm or warning. The law in the United States states that, when an adult is sitting on a passenger seat, an air-bag must be deployed in the event of a vehicle collision or the like. On the other hand, the law also states that, when a passenger such as a baby or a child is placed in a child seat fixed on the passenger seat in a manner where the occupant of the child seat faces the seat back of the passenger seat, the air-bag must not be deployed because an impact caused by the deployed air-bag may cause damage to the occupant of the child seat in a car accident. A determination that the passenger sitting on the passenger seat is an adult, is executed on the basis of a value of a weight of an adult female whose weight is relatively light and height is relatively low. A determination that the passenger sitting on the passenger seat is a child, is executed on the basis of a suitable basis. Thus, in view of safety matter, it is important to determine a type of the passenger on the basis of a weight of the passenger.

One example of an apparatus for measuring the weight of the passenger, in other words measuring a level of a load applied to the supporting portion of the vehicle seat, is disclosed in JP3904913B describing a load detecting structure for a vehicle seat. The load detecting structure includes a load detecting means using four strain gauges provided at four positions, respectively, between lower rails attached to a vehicle seat and leg members attached to a vehicle floor, and the weight of the passenger is calculated by summing up the loads detected by the four strain gauges. Further, in order to determine whether or not a passenger is sitting on the vehicle seat or to determine whether a passenger sitting on the vehicle seat is an adult or a child, measuring an accurate load does not necessarily. Thus, there exists load detecting means provided at one of supporting portions of the vehicle seat in order to detect a partial load value of the load applied to the vehicle. The seat weight measuring apparatus disclosed in JP2001-150997A is configured by a sensor provided at one of three supporting portions, a front-right supporting portion, a front-left supporting portion and the rear-center supporting portions, of the vehicle seat. Specifically, the sensor is provided at the rear-center portion of the vehicle seat. In this configuration, the number of the load sensors may be reduced, thereby reducing costs of the parts and costs of assembling and wiring.

The apparatus disclosed in JP2001-150997A for detecting the partial load applied to the vehicle seat is preferable in view of the cost reduction, however, because the detected load value may vary in accordance with the tilt angle of the vehicle, the result determined by the apparatus disclosed in JP2001-150997A is less accurate compared to the apparatus disclosed in JP3904913B in which a total load applied to the vehicle seat is detected. For example, because the load sensor disclosed in JP2001-150997A is provided at the rear of the seat, when the vehicle is moving down on the sloped road, the load sensor is assigned to detect a small ratio of the load placed on the seat, compared to a situation where the vehicle is driving on a flat road. Thus, the load sensor may underestimate the load value applied to the vehicle seat. In order to increase a level of the determination accuracy, a tilt sensor for detecting a tilt angle of the vehicle may be additionally provided, however, the cost of the apparatus is increased by a cost for the tilt sensor, thereby offsetting the cost reduction achieved by reducing the number of the load sensors. The detected tilt angle may be used for correcting the load applied to the vehicle seat.

A need thus exists for a vehicle tilt detecting apparatus having a seat load detecting apparatus, which is not susceptible to the drawback mentioned above.

SUMMARY

According to an aspect of this disclosure, a vehicle tilt detecting apparatus includes a load sensor provided at least one of supporting portions, at which a seat of a vehicle is supported, for detecting a load acts on the supporting portion to which the load sensor is provided, a load detecting portion detecting a partial load value of the load placed on the seat on the basis of an output from the load sensor and outputting a detected load value, first interrelating portion indicates a relation between a detected load value of no-load, outputted when no-load is placed on the seat from the load detecting portion, and a front-rear tilt angle of the vehicle, unoccupied seat determining portion determining an unoccupied state, where no-load is placed on the seat, when the detected load value outputted from the load detecting portion is less than an unoccupied seat determining value and front-rear tilt angle calculating portion calculating the front-rear tilt angle corresponding to the detected load value outputted from the load detecting portion, on the basis of the first interrelating portion, when the unoccupied seat determining portion determines the unoccupied state.

According to another aspect of this disclosure, a vehicle tilt detecting apparatus includes load sensors provided at supporting portions at which a seat of a vehicle is supported for detecting a load acts on the supporting portion to which the load sensor is provided, the supporting portions being provided so as to be distant from each other in a vehicle width direction, a load detecting portion detecting a partial load value of the load placed on the seat on the basis of outputs from the load sensors and outputting a detected load value, unoccupied seat determining portion determining an unoccupied state, where no-load is placed on the seat, when the detected load value outputted from the load detecting portion is less than an unoccupied seat determining value, output difference calculating portion calculating an output difference between the outputs from the road sensors provided at a right side and a left side of the seat in a vehicle width direction, second interrelating portion indicates a relation between the output difference, calculated when no-load is placed on the seat, and a right-left tilt angle of the vehicle and right-left tilt angle calculating portion calculating the right-left tilt angle corresponding to the output difference calculated by the output difference calculating portion, on the basis of the second interrelating portion, when the unoccupied seat determining portion determines the unoccupied state.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
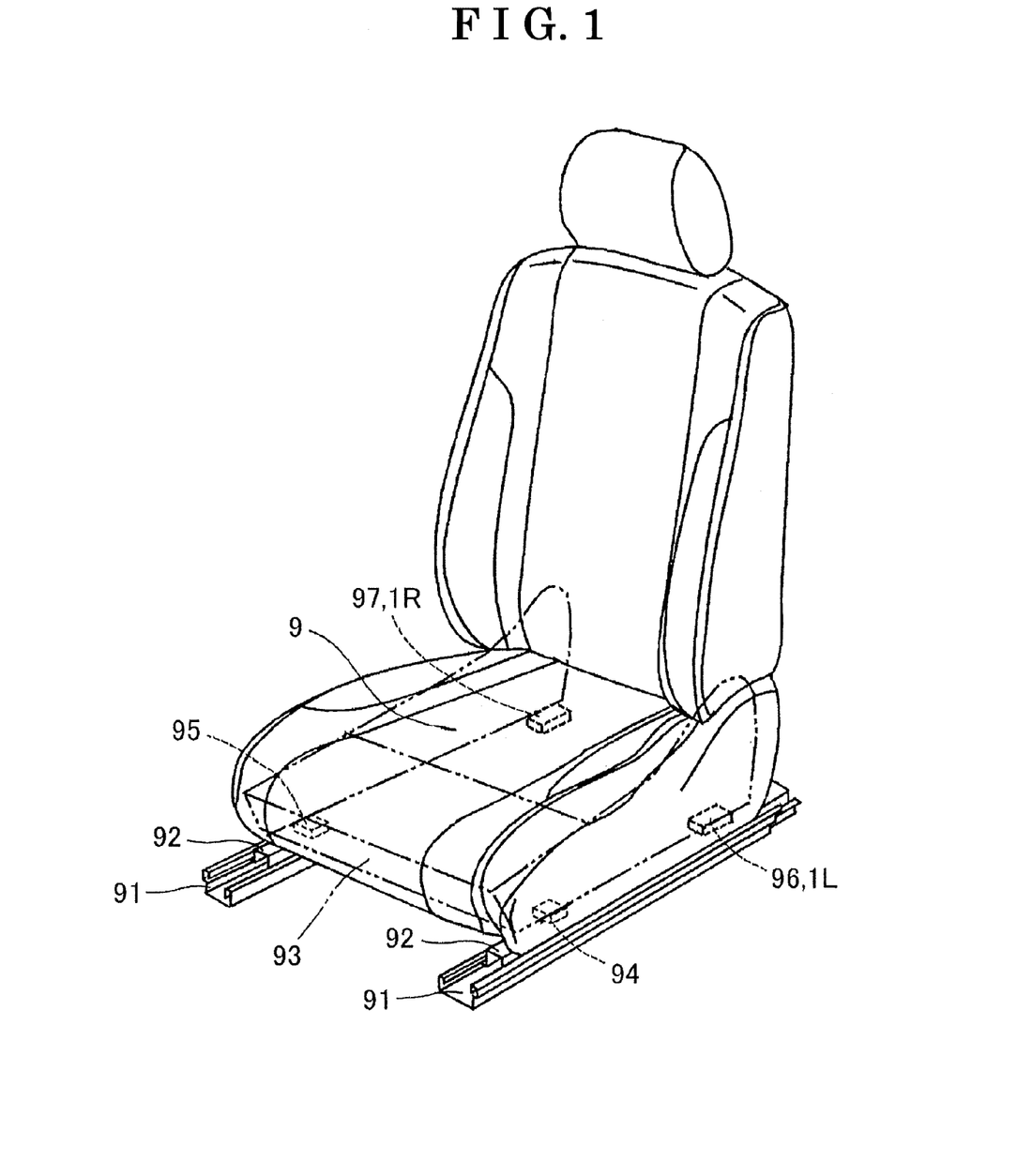
FIG. 1 is a diagram of a front passenger seat to which a vehicle tilt detecting apparatus of a first embodiment of this disclosure is attached.

A first embodiment of this disclosure will be explained in accordance with FIGS. 1 through 4. FIG. 1 is a diagram indicating a front passenger seat (hereinafter referred to as a seat 9) to which a vehicle tilt detecting apparatus 1 of the first embodiment is attached. As illustrated in FIG. 1, the seat 9 is slidable in a front-rear direction of the vehicle by means of a slide mechanism configured by a pair of lower rails 91 and a pair of upper rails 92, which are provided so as to extend in the front-rear direction of the vehicle. A lower frame 93 of the seat 9 covered by a cushion is supported by the upper rails 92 by means of four supporting portions 94 through 97, each of which is positioned at each four corner of an under surface of the lower frame 93. Supporting portions 94 and 95 are arranged at a front portion of the seat 9 so as to be distant from each other in a vehicle width direction and are configured to support a load placed on the seat 9. Supporting portions 96 and 97 (e.g., first and second supporting portions) are arranged at a rear portion of the seat 9 so as to be distant from each other in the vehicle width direction. In this configuration, a rear-left load sensor 1L is provided at the supporting portion 96, and a rear-right load sensor 1R is provided at the supporting portion 97.

Figure 2:
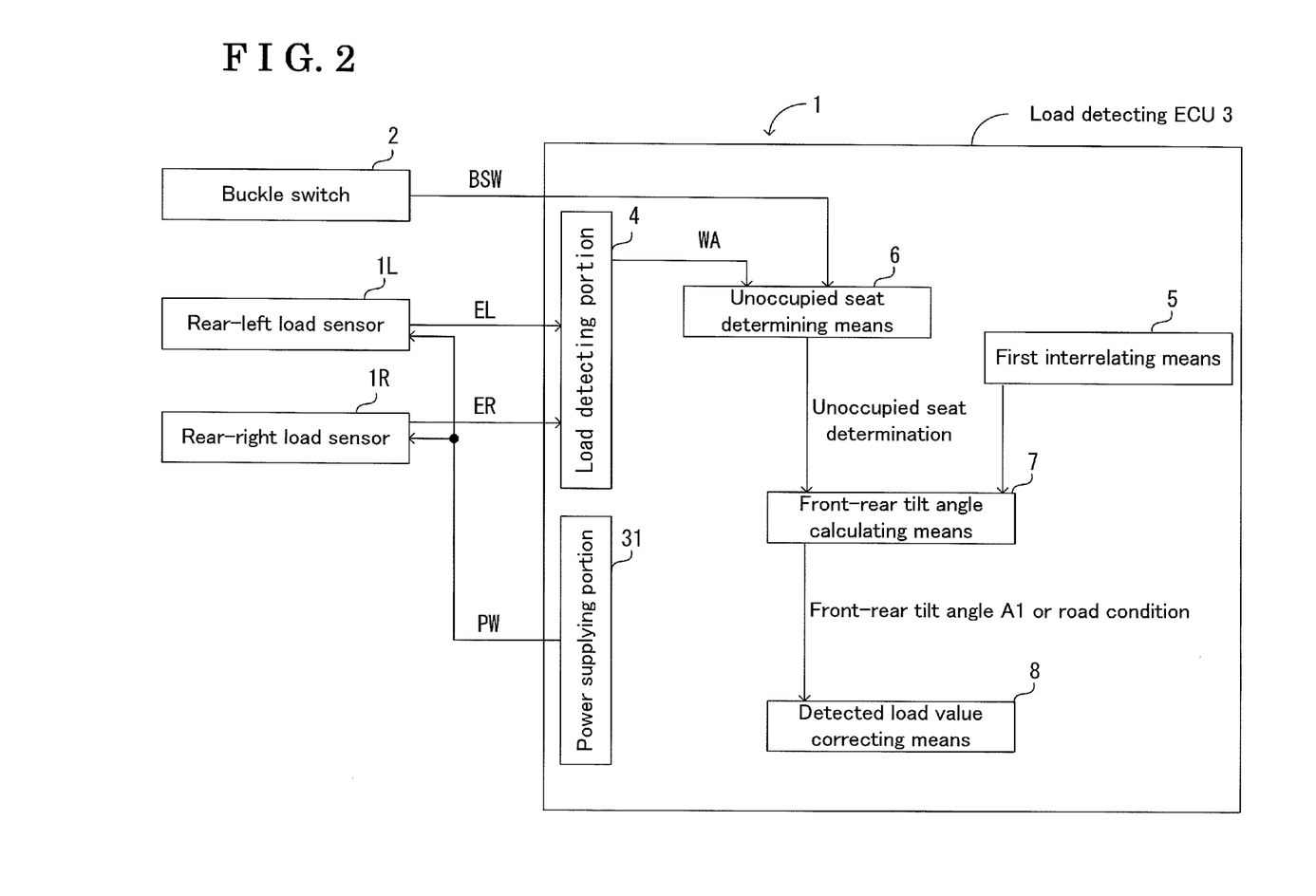
FIG. 2 is a configuration diagram of the vehicle tilt detecting apparatus of the first embodiment.

FIG. 2 is a configuration diagram of the vehicle tilt detecting apparatus 1 of the first embodiment. The vehicle tilt detecting apparatus detects a front-rear tilt angle of the vehicle when the load such as a passenger is not placed on the seat 9. The vehicle tilt detecting apparatus also functions as a seat load detecting apparatus for detecting a partial load value of the load placed on the seat 9 when the load such as the load of the passenger is placed on the seat 9. As illustrated in FIG. 2, the vehicle tilt detecting apparatus 1 is configured by the rear-left load sensor 1L (hereinafter simply referred to as a load sensor 1L), the rear-right load sensor 1R (hereinafter simply referred to as a load sensor 1R), a buckle switch 2 and a load detecting ECU 3.

Each of the load sensors 1L and 1R is a strain gauge type sensor, and the load sensor 1L outputs an electric output EL, and the load sensor 1R outputs an electric output ER. Both of the electric outputs EL and ER are inputted into a load detecting portion 4 of the load detecting ECU 3. Power PW is supplied by a power supplying portion 31 of the load detecting ECU 3 to each of the load sensors 1L and 1R. The buckle switch 2 used for detecting a state of a seatbelt is provided at a buckle. The buckle is provided at the seat 9 to which the seat belt is attached. The buckle switch 2 outputs buckle information BSW that is inputted into the load detecting ECU 3. The load detecting ECU 3 is an electronic control apparatus that includes a calculating portion, a memorizing portion, an input portion and an output portion and is operated by software. The load detecting portion 4, a detected load value of no-load and front-rear tilt angle interrelating means 5 (hereinafter simply referred to as a first interrelating means (a first interrelating portion) 5), an unoccupied seat determining means (an unoccupied seat determining portion) 6, a front-rear tilt angle calculating means (a front-rear tilt angle calculating portion) 7, a detected load value correcting means (a detected load value correcting portion) 8, which will be described in detail further below, are functioning means each of which is realized by a software as a main component.

The load detecting portion 4 is provided at the input portion of the load detecting ECU 3. The load detecting portion 4 includes an ND converter, calculates a total of the electric outputs EL and ER from the load sensors 1L and 1R and outputs a detected load valve WA (unit is N or kgw) calculated by applying the total of the electric outputs EL and ER to a predetermined conversion equation.

A zero point correction of each of the load detecting portion 4 and the detected load value WA is executed in advance. In a basic state where the vehicle is not tilted and the load is not placed on the seat 9, the weight of the seat 9 partially acts on the both of the load sensors 1L and 1R. The zero point correction is executed in the basic state (the state where the vehicle is not tilted and no-load is placed on the seat) in such a way that the electric outputs EL and ER are adjusted so that a level of each of the electric outputs EL and ER is set to zero. Alternatively, each constant number of the conversion equation of the load detecting portion 4 may be set in such a way that the detected load value WA becomes zero, while the electric outputs EL and ER are not zero. By executing the zero point correction, the detected load value WA indicates a value that corresponds to a load from which the weight of the seat 9 is eliminated.

After the zero point correction, the first interrelating means 5 is set in advance. Specifically, the first interrelating means 5 is obtained by calculating the detected load values WA under circumstances where the vehicle is tilted at various degrees (a front-rear tilt angle A1) in a front-rear direction of the vehicle in a situation where the load is not placed on the seat 9. The detected load values WA are detected load values of no-load WA0, and the first interrelating means 5 may be set in such a way that an interrelation between the detected load values of no-load WA0 and the front-rear tilt angles A1 is stored in a memory as a form of an interrelation map or a function formula. In the embodiment, as the vehicle is tilted in a manner where a front portion of the vehicle becomes lower than a rear portion of the vehicle, the supporting portions 94 and 95 provided at the front portion of the seat 9 are assigned to receive a large ratio of the weight of the seat 9, and the electric outputs EL and ER of the load sensors 1L and 1R provided at the supporting portions 96 and 97, respectively, are reduced, thereby reducing the detected load value of no-load WA0. On the other hand, as the vehicle is tilted in a manner where the front portion of the vehicle becomes higher than the rear portion of the vehicle, the supporting portions 96 and 97 provided at the rear portion of the seat are assigned to receive a large ratio of the weight of the seat 9, thereby increasing the detected load value of no-load WA0.

Figure 3:
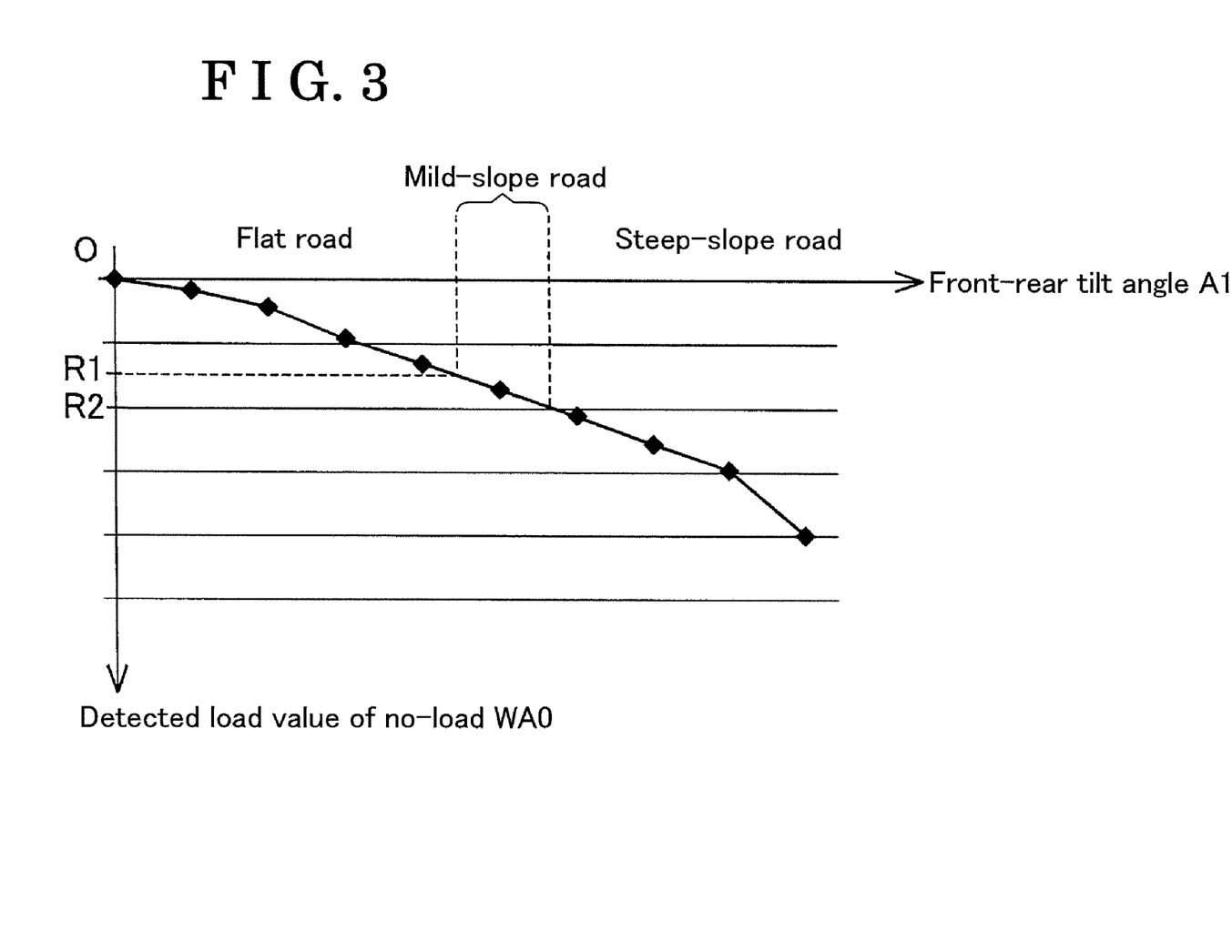
FIG. 3 is a characteristic graph indicating an example of a first interrelating portion configured in FIG. 2.

FIG. 3 is a characteristic graph indicating an example of the first interrelating means 5 explained in the configuration diagram of FIG. 2. A vertical axis in the graph indicates the detected load value of no-load WA0, and a horizontal axis in the graph indicates the front-rear tilt angle A1 in a situation where the vehicle is positioned on a slope in a manner where a front portion of the vehicle is lower than a rear portion of the vehicle. The characteristic graph consists of ten dots indicating actual data connected with a solid line to each other. A base point O of the actual data indicates that the zero point correction is executed at the base point O. As shown in FIG. 3, the detected load value of no-load WA0 is approximately proportional to the front-rear tilt angle A1.

Furthermore, an unoccupied seat determining value W0 is set in advance so as to exceed a range within which the detected load value of no-load WA0 varies. The unoccupied seat determining value W0 is not set to zero in order to avoid a situation where an unoccupied state of the seat is not detected under a circumstance where, even when the seat is unoccupied, the detected load value of no-load WA0 becomes a positive value because a vehicle stops on a sloping road in a manner where a front portion of the vehicle is higher than a rear portion of the vehicle.

The occupied seat determining means 6 determines an unoccupied state of the seat on the basis of input information such as the detected load value WA from the load detecting portion 4 and the buckle information BSW from the buckle switch 2. Logic for the determination executed by the occupied seat determining means 6 is as follows. The occupied seat determining means 6 determines that the seat 9 is not occupied when the buckle information BSW is determined to be "off", which means the seat belt is not fastened, and the detected load value WA is determined to be equal to or less than the unoccupied seat determining value W0.

After the unoccupied seat determining means 6 determines that the seat 9 is in an unoccupied state, on the basis of the first interrelating means 5 (e.g., an interrelation map, a function formula or the like), the front-rear tilt angle calculating means 7 calculates the front-rear tilt angle A1 of the vehicle corresponding to the detected load value WA outputted from the load detected portion 4. Specifically, the front-rear tilt angle calculating means 7 calculates a front-rear tilt angle A1 corresponding to the detected load value WA by searching the interrelation map, or the front-rear tilt angle calculating means 7 calculates a front-rear tilt angle A1 corresponding to the detected load value WA by substituting the detected load value WA into a function formula. Furthermore, according to the embodiment, the front-rear tilt angle calculating means 7 determines a level of a slope of the road (e.g., a road condition), which is approximately equivalent to a tilt angle of the vehicle, as one of three degrees (a flat road, a mild-slope road or a steep-slope road), by use of a mild-slope determining value R1 and a steep-slope determining value R2 as indicated in FIG. 3. Specifically, as indicated in FIG. 3 where a graph changes downwardly, the front-rear tilt angle calculating means 7 determines the road condition to be the flat road when the detected load value WA exists in a range from the positive value including zero to a point not downwardly exceeding the mild-slope determining value R1. The front-rear tilt angle calculating means 7 determines the road condition to be the mild-slope road when the detected load value WA exists in a range from a point being equal to the mild-slope determining value R1 to a point not downwardly exceeds the steep-slope determining value R2. The front-rear tilt angle calculating means 7 determines the road condition to be the steep-slope road when the detected load value WA is equal to or downwardly exceeds the steep-slope determining value R2.

The detected load value correcting means 8 corrects the detected load value WA, outputted by the load detecting portion 4 when the load is placed on the seat 9, in accordance with the front-rear tilt angle A1. In order to execute the load value correction, the detected load value correcting means 8 stores a mild-slope correction load value H1 that corresponds to the mild-slope and also stores a steep-slope correction load value H2 that corresponds to the steep-slope. The detected load value correcting means 8 does not correct the detected load value WA when the vehicle is on the flat road. When the vehicle is on the mild-slope road, the detected load value correcting means 8 corrects the detected load value WA by adding the mild-slope correction load value H1 thereto. When the vehicle is on the steep-slope road, the detected load value correcting means 8 corrects the detected load value WA by adding the steep-slope correction load value H2 thereto. According to those corrections, the unevenness of the load ratio received by each portion of the seat 9 in the same manner as the weight of the seat 9, in other words the unevenness occurred in a situation where the supporting portions 96 and 97 are assigned to receive less ratio of the load as a level of a slope angle is increased so that the front portion of the vehicle becomes lower than the rear portion of the vehicle, may be compensated, thereby reducing a level of influence caused by the slope of the road.

Next, an actuation and a calculating process of the vehicle tilt detecting apparatus 1 related to the first embodiment will be explained in accordance with a flowchart in FIG. 4 indicating a calculation of a slope angle of a stopping vehicle. The slope angle calculation flow is for detecting a front-rear tilt angle A1 of the vehicle when the vehicle is in a stopping state and determining the road condition as one of the above-mentioned degrees (flat, mild-slope or steep-slope).

Figure 4:
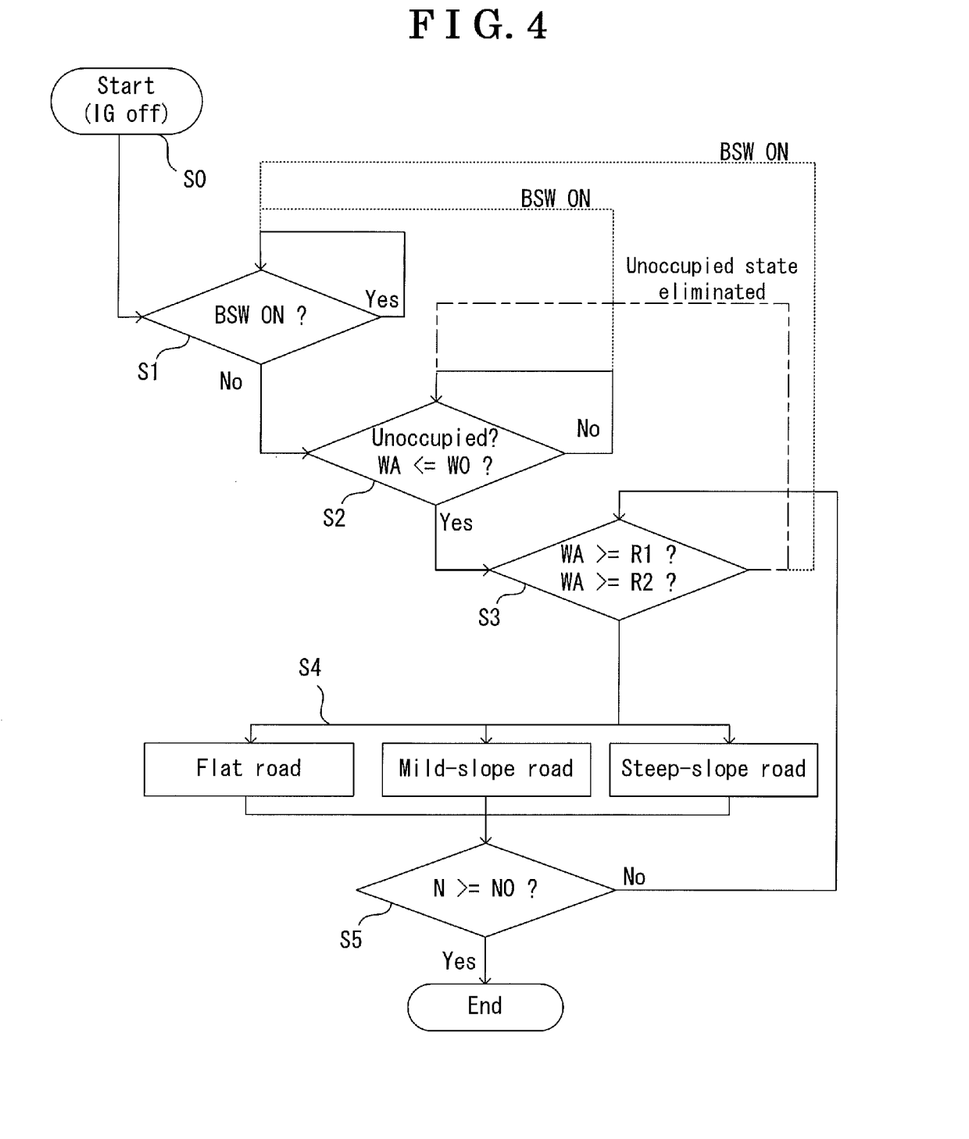
FIG. 4 is a flowchart indicating a slope angle calculation of the vehicle tilt detecting apparatus of the first embodiment executed when the vehicle stops.

As indicated in FIG. 4, the slope angle calculation flow of the load detecting ECU 3 is executed when the load detecting ECU 3 determines that the ignition switch IG is turned off in Step S0. In Step S1, the unoccupied seat determining means 6 confirms the buckle information BSW of the buckle switch 2. When the buckle information BSW is "OFF" (No in S1), the process goes to Step S2 in which an unoccupied state of the seat is determined. When the buckle information BSW is "ON" (Yes in S1), the unoccupied seat determining means 6 determines that the load is placed on the seat 9, for example a passenger is sitting on the seat, and then the confirmation of the buckle information BSW is repeatedly executed at a predetermined cycle T1.

In Step S2, the load detecting ECU 3 starts supplying power PW to the load sensors 1L and 1R from the power supplying portion 31, and the load detecting portion 4 obtains the electric outputs EL and ER of the load sensors 1L and 1R and calculates a detected load value WA by summing up the obtained electric outputs EL and ER. The unoccupied seat determining means 6 repeats sampling the detected load value WA multiple times and determines an unoccupied state of the seat when the detected load value WA is in stable at the unoccupied seat determining value W0 or less. Then, the process goes to Step S3 in which a front-rear tilt angle of the vehicle is calculated. On the other hand, when the unoccupied seat determining means 6 determines that the detected load value WA exceeds the unoccupied seat determining value W0, the unoccupied seat determining means 6 determines that a load such as a passenger is placed on the seat 9, and then the unoccupied seat determining means 6 executes the sampling of the detected load value WA repeatedly at the sampling cycle T1. During the determination of Step S2, when the buckle information BSW changes its state to "ON", the unoccupied seat determining means 6 determines that an additional load is placed on the seat 9, and then the process returns to Step S1.

In Step S3, the front-rear tilt angle calculating means 7 executes a comparison between the detected load value WA and the mild-slope determining value R1 and a comparison between the detected load value WA and the steep-slope determining value R2, and then the process goes to Step S4. In Step S4, a road condition (e.g., a slope state) is temporarily determined as one of the flat road, the mild-slope road and the steep-slope road. The temporal determination in Steps S3 and S4 is repeatedly executed. In Step S5, on the basis of the repeatedly-executed temporal determinations of the slope state of the road, the load detecting ECU 3 counts up a continuation of same determinations and sets the number of continuations to a continuing number N. For example, the road is determined as the mild-slope road continued to the previous mild-slope road determination, "1" is added to the continuing number N for the mild-slope road. Once the continuing number N reaches a reference number N0, the road condition is determined. For example, when the continuing number N for the mild-slope road determination reaches the reference number N0, the road condition is determined as the mild-slope road. When the continuing number N does not reach the reference number N0, the process returns to Step S3. During the repeated executions of Steps S3 through S5, when the detected load value WA exceeds the unoccupied seat determining value W0, the unoccupied seat determining means 6 determines that the unoccupied state of the seat is eliminated, and then the process returns to Step S2. During the repeated executions of Steps S3 through S5, when the buckle information BSW changes its state to "ON", the process returns to Step S1.

Once the slope state of the road (e.g., the road condition) is defined by executing the above-mentioned slope angle calculation flow, the load detecting ECU 3 terminates its actuation. The defined road condition is outputs to the detected load value correcting means 8 and used for a correction for a later load value placed on the seat 9.

When a predetermined time period passes before the buckle information BSW is turned to be "OFF" or before the detected load value WA is at the unoccupied seat determining value W0 or less, the load detecting ECU 3 terminates its actuation without obtaining the slope state of the road. In other words, when a passenger or a luggage is still placed on the seat 9 while the vehicle is stopping, because the seat is not in the unoccupied state where the front-rear tilt angle cannot be detected, the actuation for the load detecting ECU 3 is terminated for the sake of saving power consumption.

Even when the ignition switch IG is turned on, the determination of the slope state of the road (e.g., the road condition) may be executed as long as the seat is in an unoccupied state. In this situation, the sampling cycle for sampling the detected load value WA is set to a sampling cycle T2 that is shorter in order to quickly define the slope state of the road within a short time period before the vehicle starts. On the other hand, when the ignition switch IG is turned off as indicated in FIG. 4, the sampling cycle T1 for sampling the detected load value WA is set to be longer than the sampling cycle T2 (T1>T2) in order to reduce useless discharge from a in-vehicle battery, thereby saving power consumption.

Further, the front-rear tilt angle calculating means 7 and the detected load value correcting means 8 may be configured to use the characteristic graph indicated in FIG. 3 in an interrelation map or a relational expression, instead of determining the front-rear tilt angle A1 to one of preset three stages of slope state of the road.

The vehicle tilt detecting apparatus 1 of the first embodiment is configured by the rear-left load sensor 1L, the rear-right load sensor 1R, the buckle switch 2 and the load detecting ECU 3, which may be used commonly with a seat load detecting apparatus, thereby reducing costs as a whole.

Further, because the rear-left load sensor 1L and the rear-right load sensor 1R are provided at the rear-left portion and the rear-right portion of the seat, respectively, so as to be distant from each other, variations of the load ratio of the weight of the seat 9 received by the front portion of the seat and variations of the load ratio of the weight of the seat 9 received by the rear portion of the seat, which may vary depending on the front-rear tilt angle A1, may be detected with high sensitivity. Further, the front-rear tilt angle A1 may be detected with high accuracy. Further, because the load is obtained by summing up the load sensors 1L and 1R, even when the vehicle is tilted in the vehicle width direction (a right-left tilt angle), the right-left tilt angle may not affect the detected load value WA, and the front-rear tilt angle A1 may be accurately calculated.

Furthermore, because the front-rear tilt angle calculating means 7 determines the slope state of the road (e.g., the road condition) on which the vehicle is stopping as one of the flat road, the mild-slope road and the steep-slope road, the calculation and the process may be simply and efficiently executed by the detected load value correcting means 8 and following processes.

Further, the load detecting portion 4 is actuated at the sampling cycle T1 being set to be longer, when the ignition switch is turned off, the load sensors 1L and 1R may be intermittently actuated, thereby saving power consumption. On the other hand, the load detecting portion 4 is actuated at the sampling cycle T2 being set to be shorter, when the ignition switch is turned on, so that the slope state of the road may be defined within a short time period before the vehicle starts moving.

Further, the unoccupied seat determining means 6 has the logic for determination in which the unoccupied state of the seat is determined when the seat belt is not fastened, a level of accuracy of the determination of the unoccupied state of the seat is relatively high.

Furthermore, the apparatus includes the detected load value correcting means 8 by which the detected load value WA is corrected so that the partial load value of the load placed on the seat may be detected with high accuracy by reducing the influence of the slope state of the road.

Figure 5:
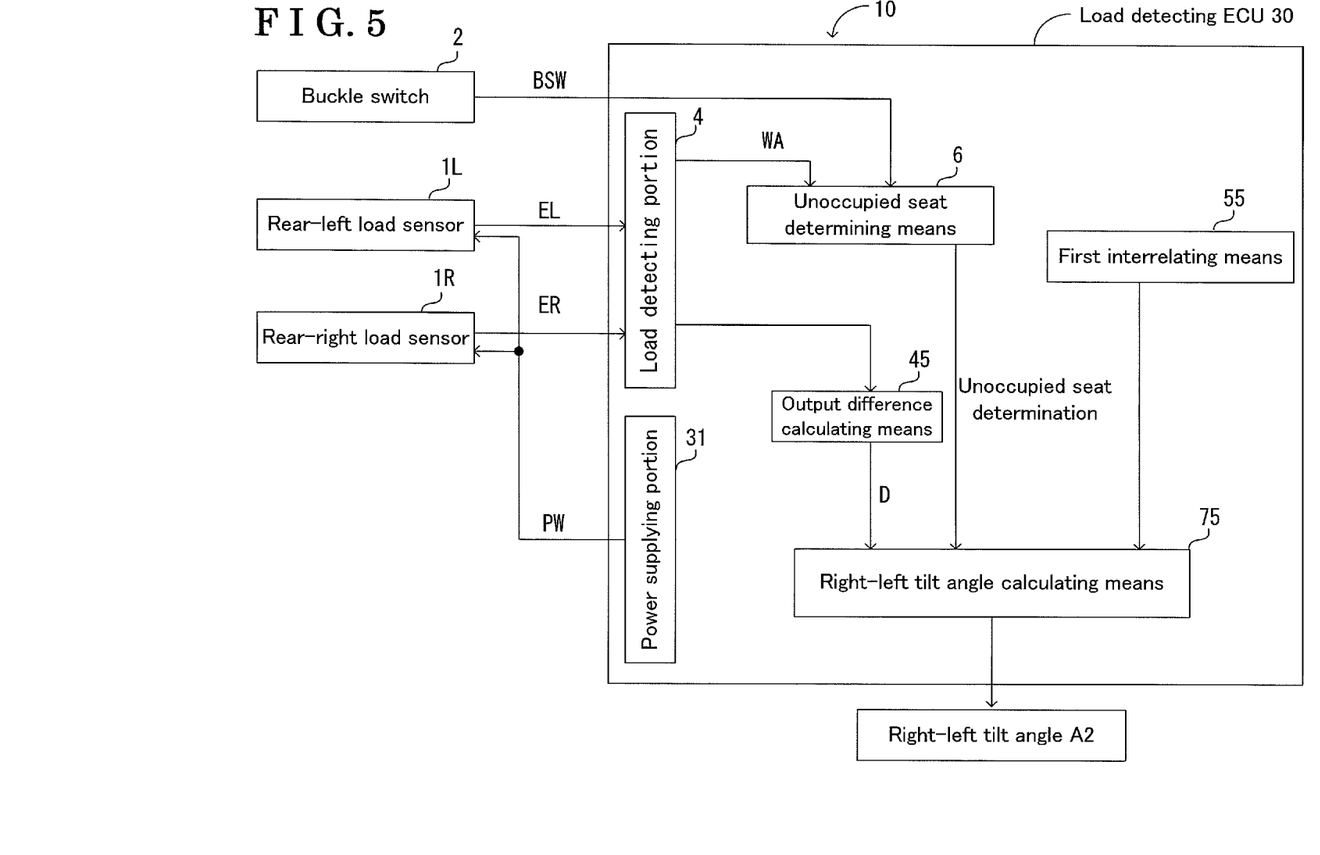
FIG. 5 is a configuration diagram of a vehicle tilt detecting apparatus of a second embodiment.
Figure 6:
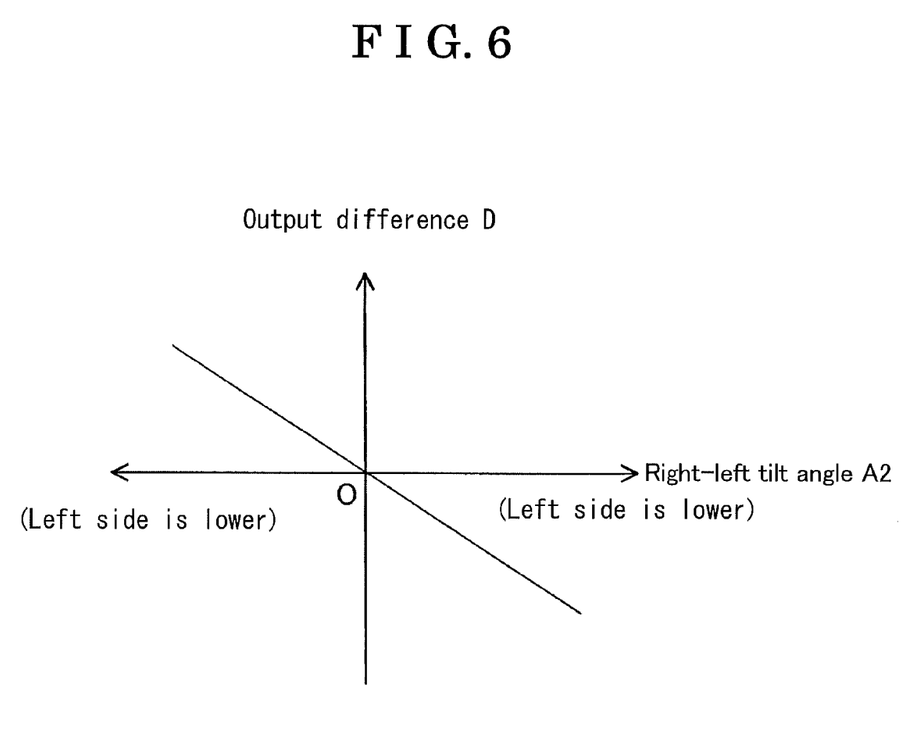
FIG. 6 is a characteristic graph indicating an example of a second interrelating portion configured in FIG. 5.

A second embodiment of a vehicle tilt detecting apparatus for detecting a right-left angle of a vehicle will be explained in accordance with FIGS. 5 and 6. The vehicle tilt detecting apparatus in the second embodiment is basically similar to that in the first embodiment, and thus the explanation below will focus on the differences therebetween. FIG. 5 is a configuration diagram of a vehicle tilt detecting apparatus 10 of the second embodiment. FIG. 6 is a characteristic graph indicating an example of a sensor output difference right-left tilt angle interrelating means 55 (hereinafter referred to as a second interrelating means 55) in the configuration indicated by FIG. 5. Comparing the configuration in FIG. 5 to the configuration in FIG. 2, the vehicle tilt detecting apparatus 10 of the second embodiment includes an output difference calculating means 45, the second interrelating means 55 corresponding to the first interrelating means 5 in the first embodiment and a right-left tilt angle calculating means 75 corresponding to the front-rear tilt angle calculating means 7 in the first embodiment. The vehicle tilt detecting apparatus 10 of the second embodiment does not include a means that is equivalent to the detected load value correcting means 8 in the first embodiment.

The output difference calculating means 45 is provided at a downstream of the load detecting portion 4 in a flow of the process executed by the load detecting ECU 30 in order to calculate an output difference D by subtracting an electric output ER of the rear-right load sensor 1R from an electric output EL of the rear-left load sensor 1L (D=EL−ER). when the load of the weight of the seat 9 is disproportionately placed on the left-right load sensor 1L as the vehicle is tilted in a manner where a left portion of the vehicle becomes lower than a right portion of the vehicle, the output difference D is increased. On the other hand, when the load of the weight of the seat 9 is disproportionately placed on the rear-right load sensor 1R as the vehicle is tilted in a manner where the left portion of the vehicle becomes higher than the right portion of the vehicle, the output difference D is decreased. The second interrelating means 55 indicates an interrelation between the output differences D and right-left tilt angles A2, and the characteristic graph of FIG. 6 indicates an example of the interrelating means 55. The right and left tilt angle calculating means 75 calculates the right-left tilt angle A2 of the vehicle corresponding to the output difference D, on the basis of the interrelating means 55, when the unoccupied seat determining means 6 determines that the seat is in an unoccupied state.

According to the vehicle tilt detecting apparatus 10 of the second embodiment, when the unoccupied seat determining means 6 determines that the seat is in an unoccupied state in the same manner as the first embodiment, the right-left tilt angle calculating means 75 calculates the right-left tilt angle A2. An actuation and a calculating process of the vehicle tilt detecting apparatus 10 is basically similar to that of the first embodiment as illustrated in FIG. 4, and explanations thereof are therefore omitted.

The second embodiment is different from the first embodiment only in terms of the functional means in the load detecting ECU. The vehicle tilt detecting apparatuses 1 and 10 are obtained on the basis of an identical hardware configuration operated by different software, respectively. All of the load detection, the front-rear tilt angle detection and the right-left tilt angle detection are executed by a single apparatus.

Further, in the first embodiment, the vehicle tilt detecting apparatus 1 may not have two load sensors 1R and 1L provided at the rear-right portion and the rear-left portion of the seat 9, respectively. The vehicle tilt detecting apparatus 1 may alternatively have a single load sensor provided at a rear-central portion of the seat 9 or may alternatively have four load sensors provided at a front-right portion, a front-left portion, the rear-right portion and the rear-left portion of the seat 9, respectively. Furthermore, in the second embodiment, the vehicle tilt detecting apparatus 10 may also not have two of the load sensors 1R and 1L provided at the rear-right portion and the rear-left portion of the seat 9, respectively. The vehicle tilt detecting apparatus 10 may alternatively have four load sensors provided at a front-right portion, a front-left portion, the rear-right portion and the rear-left portion of the seat 9, respectively. The vehicle tilt detecting apparatus 10 preferably has an even number of load sensors provided symmetrically at the right and left sides of the seat 9.

The calculated right-left tilt angle and the front-rear tilt angle are used not only for correction of the load but also for adjusting an operational force to open and close a power slide door or a swing door. The concept, technology and the like in this disclosure may be used in various fields.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle tilt detecting apparatus comprising: a load sensor provided at least one of supporting portions, at which a seat of a vehicle is supported, for detecting a load acting on the supporting portion to which the load sensor is provided; a load detecting portion detecting a partial load value of the load placed on the seat on the basis of an output from the load sensor and outputting a detected load value; a first interrelating portion indicating a relation between a detected load value of no-load, outputted when no-load is placed on the seat from the load detecting portion, and a front-rear tilt angle of the vehicle; a unoccupied seat determining portion determining an unoccupied state, where no-load is placed on the seat, when the detected load value outputted from the load detecting portion is less than an unoccupied seat determining value; and a front-rear tilt angle calculating portion calculating the front-rear tilt angle corresponding to the detected load value outputted from the load detecting portion, on the basis of the first interrelating portion, when the unoccupied seat determining portion determines the unoccupied state.

2. The vehicle tilt detecting apparatus according to claim 1, wherein two load sensors are provided at two of the said supporting portions, respectively, the two of the supporting portions being arranged at rear of the seat so as to be distant from each other, and the load detecting portion sums up outputs from the two load sensors in order to detect the partial load value of the load placed on the seat.

3. The vehicle tilt detecting apparatus according to claim 2, wherein the front-rear tilt angle calculating portion determines a slope state of a road on which the vehicle stops as one of preset plural stages of a slope state, on the basis of the calculated front-rear tilt angle of the vehicle.

4. The vehicle tilt detecting apparatus according to claim 3, wherein the load detecting portion detects the partial load value of the load placed on the seat by sampling the output from the load sensor at a predetermined sampling cycle that is set to be long when an ignition switch is turned off and is set to be short when the ignition switch is turned on.

5. The vehicle tilt detecting apparatus according to claim 2, wherein the load detecting portion detects the partial load value of the load placed on the seat by sampling the output from the load sensor at a predetermined sampling cycle that is set to be long when an ignition switch is turned off and is set to be short when the ignition switch is turned on.

6. The vehicle tilt detecting apparatus according to claim 2, wherein the unoccupied seat determining portion determines the unoccupied state of the seat when the detected load value is less than the unoccupied seat determining value and a buckle switch, detecting whether or not a seat belt provided at the seat is fastened, is turned off.

7. The vehicle tilt detecting apparatus according to claim 3, wherein the unoccupied seat determining portion determines the unoccupied state of the seat when the detected load value is less than the unoccupied seat determining value and a buckle switch, detecting whether or not a seat belt provided at the seat is fastened, is turned off.

8. A seat load detecting apparatus having the vehicle tilt detecting apparatus according to claim 2 for detecting the partial load value of the load placed on the seat, wherein the seat load detecting apparatus includes a detected load value correcting portion for correcting the detected load value outputted from the load detecting portion when the load is placed on the seat in accordance with the front-rear tilt angle.

9. The vehicle tilt detecting apparatus according to claim 1, wherein the front-rear tilt angle calculating portion determines a slope state of a road on which the vehicle stops as one of preset plural stages of a slope state, on the basis of the calculated front-rear tilt angle of the vehicle.

10. The vehicle tilt detecting apparatus according to claim 9, wherein the load detecting portion detects the partial load value of the load placed on the seat by sampling the output from the load sensor at a predetermined sampling cycle that is set to be long when an ignition switch is turned off and is set to be short when the ignition switch is turned on.

11. The vehicle tilt detecting apparatus according to claim 9, wherein the unoccupied seat determining portion determines the unoccupied state of the seat when the detected load value is less than the unoccupied seat determining value and a buckle switch, detecting whether or not a seat belt provided at the seat is fastened, is turned off.

12. A seat load detecting apparatus having the vehicle tilt detecting apparatus according to claim 9 for detecting the partial load value of the load placed on the seat, wherein the seat load detecting apparatus includes a detected load value correcting portion for correcting the detected load value outputted from the load detecting portion when the load is placed on the seat in accordance with the front-rear tilt angle.

13. The vehicle tilt detecting apparatus according to claim 1, wherein the load detecting portion detects the partial load value of the load placed on the seat by sampling the output from the load sensor at a predetermined sampling cycle that is set to be long when an ignition switch is turned off and is set to be short when the ignition switch is turned on.

14. The vehicle tilt detecting apparatus according to claim 13, wherein the unoccupied seat determining portion determines the unoccupied state of the seat when the detected load value is less than the unoccupied seat determining value and a buckle switch, detecting whether or not a seat belt provided at the seat is fastened, is turned off.

15. A seat load detecting apparatus having the vehicle tilt detecting apparatus according to claim 13 for detecting the partial load value of the load placed on the seat, wherein the seat load detecting apparatus includes a detected load value correcting portion for correcting the detected load value outputted from the load detecting portion when the load is placed on the seat in accordance with the front-rear tilt angle.

16. The vehicle tilt detecting apparatus according to claim 1, wherein the unoccupied seat determining portion determines the unoccupied state of the seat when the detected load value is less than the unoccupied seat determining value and a buckle switch, detecting whether or not a seat belt provided at the seat is fastened, is turned off.

17. A seat load detecting apparatus having the vehicle tilt detecting apparatus according to claim 16 for detecting the partial load value of the load placed on the seat, wherein the seat load detecting apparatus includes a detected load value correcting portion for correcting the detected load value outputted from the load detecting portion when the load is placed on the seat in accordance with the front-rear tilt angle.

18. A seat load detecting apparatus having the vehicle tilt detecting apparatus according to claim 1 for detecting the partial load value of the load placed on the seat, wherein the seat load detecting apparatus includes a detected load value correcting portion for correcting the detected load value outputted from the load detecting portion when the load is placed on the seat in accordance with the front-rear tilt angle.

19. A vehicle tilt detecting apparatus comprising: load sensors provided at supporting portions at which a seat of a vehicle is supported for detecting a load acting on the supporting portion to which the load sensor is provided, the supporting portions being provided so as to be distant from each other in a vehicle width direction; a load detecting portion detecting a partial load value of the load placed on the seat on the basis of outputs from the load sensors and outputting a detected load value;
a unoccupied seat determining portion determining an unoccupied state, where no-load is placed on the seat, when the detected load value outputted from the load detecting portion is less than an unoccupied seat determining value; a output difference calculating portion calculating an output difference between the outputs from the load sensors provided at a right side and a left side of the seat in a vehicle width direction; a second interrelating portion indicates a relation between the output difference, calculated when no-load is placed on the seat, and a right-left tilt angle of the vehicle; and a right-left tilt angle calculating portion calculating the right-left tilt angle corresponding to the output difference calculated by the output difference calculating portion, on the basis of the second interrelating portion, when the unoccupied seat determining portion determines the unoccupied state.

20. A seat load detecting apparatus having the vehicle tilt detecting apparatus according to claim 19 for detecting the partial load value of the load placed on the seat, wherein the seat load detecting apparatus includes a detected load value correcting portion for correcting the detected load value outputted from the load detecting portion when the load is placed on the seat in accordance with the front-rear tilt angle.

* * * * *